L. LYNDON.
STORAGE BATTERY.
APPLICATION FILED APR. 30, 1919.
1,388,656.
Patented Aug. 23, 1921.
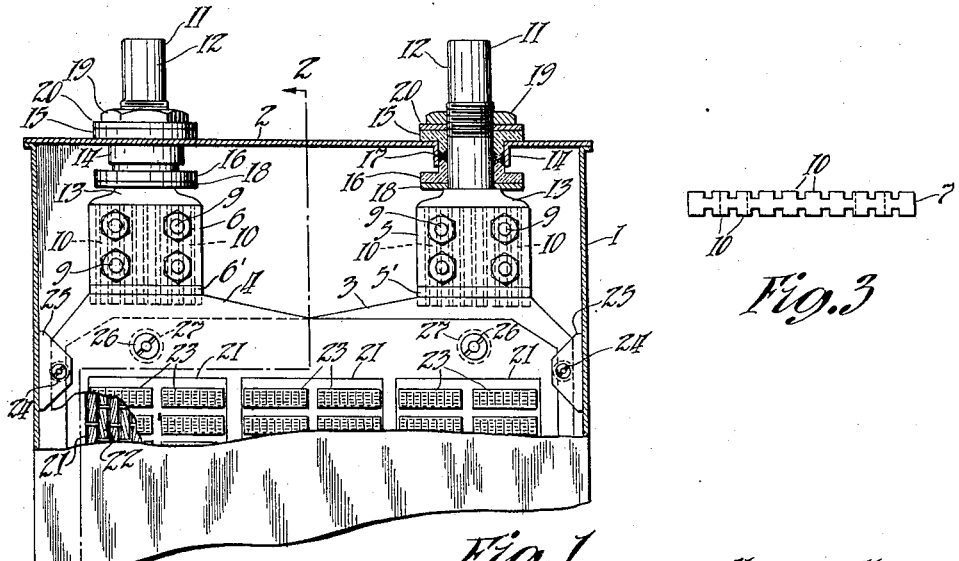
Fig.1
Fig.3
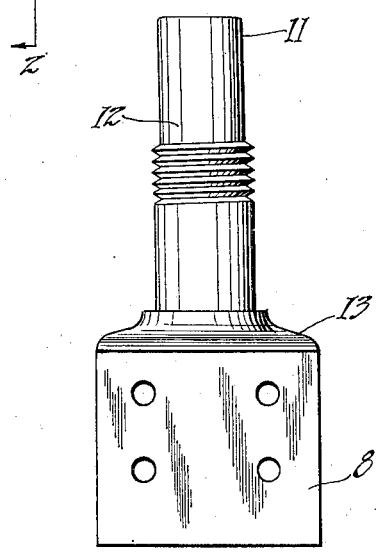
Fig.4
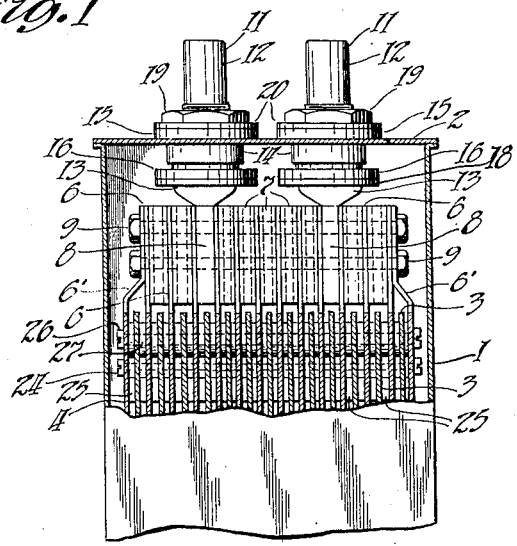
Fig.2
Witnesses:
N. L. Fisher
William A. Hardy
Inventor:
Lamar Lyndon
By Delos Holden
his Atty.

UNITED STATES PATENT OFFICE.

LAMAR LYNDON, OF WEST ORANGE, NEW JERSEY, ASSIGNOR TO EDISON STORAGE BATTERY COMPANY, OF WEST ORANGE, NEW JERSEY, A CORPORATION OF NEW JERSEY.

STORAGE BATTERY.

1,388,656.  Specification of Letters Patent.  Patented Aug. 23, 1921.

Application filed April 30, 1919. Serial No. 293,791.

*To all whom it may concern:*

Be it known that I, LAMAR LYNDON, a citizen of the United States, and a resident of West Orange, Essex county, New Jersey, have invented certain new and useful Improvements in Storage Batteries, of which the following is a description.

My invention relates to storage batteries, and while particularly directed to storage batteries of the Edison type wherein an alkaline electrolyte is employed and in which the positive elements contain flake nickel and nickel hydroxid, and the negative elements contain electrolytically active finely divided iron or oxid of iron, it is to be understood that my invention is also applicable to storage batteries of other types.

The principal object of my invention is to provide a battery structure comprising an improved mounting for the electrode plates in the cell container and improved connections between the poles of a battery cell and the electrode plates especially adapted and designed for storage batteries of great capacity and having a high rate of discharge, as for example batteries employed for supplying the power to propel submarine vessels, whereby the resistance of the cell will be reduced and there will be comparatively little loss in capacity and voltage between the electrode plates and the poles of the cell, and whereby, in general, the operation of such a battery cell will be improved and its efficiency increased.

My invention also resides in a simple and efficient arrangement and connection of the electrode plates and poles of a storage battery cell which enables the entire battery structure to be effectively and conveniently supported from the top of the cell container.

Other objects and features of my invention will be hereinafter more specifically described and claimed.

For a clearer understanding of my invention, attention is hereby directed to the accompanying drawing forming a part of this specification, and in which:—

Figure 1 is a view in front elevation, partly broken away and partly in section, of a storage battery cell in accordance with my invention;

Fig. 2 is a sectional view, partly in elevation, taken on line 2—2 of Fig. 1;

Fig. 3 is an enlarged end view of one of the spacing members disposed between the upper end projecting portions or lugs of the electrodes of the battery shown in Figs. 1 and 2; and Fig. 4 is an enlarged view in elevation of one of the poles of the cell shown in Figs. 1 and 2.

Referring to the drawing, reference character 1 represents the can or container of my improved storage battery cell, which container is preferably rectangular in form and has the top 2 and bottom (not shown) welded to the side walls thereof, as is customary in cells of the Edison type. Within the container 1 is disposed a bank of positive and negative electrode plates or elements 3 and 4, these positive and negative plates preferably being alternately arranged side by side transversely of the container, with the number of negative plates preferably exceeding the number of positive plates by one, whereby both of the outside plates adjacent the front and rear walls of the container will be of negative polarity.

The positive plates 3 are each provided at the top and adjacent one side with a terminal connection preferably in the form of an integral vertical rectangular lug or projection 5, and the negative plates 4 are each provided at the top and adjacent the opposite side with a terminal connection preferably in the form of an integral vertical rectangular projection or lug. The upper ends of all of the lugs 5 and 6 terminate at the same level within container 1 and some distance below the top 2 thereof, and the lugs of the two outside positive and two outside negative plates are deflected inwardly as shown at 5' and 6' with the upper end portions thereof respectively lying flat against the upper end portions of the lugs 5 and 6 of the adjacent positive and negative plates. The rest of the lugs 5 of the set of positive plates 3 and of the lugs 6 of the set of negative plates 4 are maintained in spaced relation by flat and relatively thick, heavy spacing members or blocks 7 and 8, preferably of the same shape and size as the lugs and formed of conducting material, preferably copper, which are respectively disposed between and in contact with pairs of adjacent lugs. The lugs 4 and 5 of the sets of positive and negative plates and the corresponding sets of spacing members 7 and 8 are respectively secured together by means of two sets of bolts 9, preferably four in each set and preferably arranged as shown, extending therethrough. Each of the spacing members 7 has its faces grooved, whereby each of the said faces is formed with a plurality of spaced and parallel ribs 10 extending from the top to the bottom thereof and having their outer surfaces in a common plane. The nuts of the sets of bolts 9 are turned up hard and consequently the projections or lugs of each of the sets of positive and negative plates and the corresponding spacing members 7 and 8 will be mechanically and electrically secured together in firm contact with each other. The lugs 5 and 6 of the positive and negative plates are thin as compared with the thick, heavy blocks or spacing members 7 and 8 and may be comparatively easily bent. Accordingly, as the nuts of bolts 9 are screwed up tight, the lugs 5 and 6 will be forced into close and uninterrupted contact with the faces of ribs 10 of the respective spacing members 7, due largely to the presence of the grooves between said ribs. The faces of each of the spacing members 7 will therefore be in close and continuous contact with the respective lugs 5 and 6 of the positive and negative plates over the greater portion of their faces, the ribs 10 preferably being considerably wider than the grooves therebetween. The spacing members 7 and 8 are comparatively large and hence there will be substantially no loss in the capacity or voltage of the cell due to resistance in the connections of the electrode plates. This is very important, for where spacing members having ungrooved and continuous faces are employed between the adjacent substantially flat upper end portions or lugs of the electrode plates, as has heretofore been customary, it is possible, because of the fact that the faces of such spacing members and also the faces of said lugs are always more or less uneven, to obtain good contact of the plates with the faces of the spacing members only at a relatively few spaced adjacent points or portions thereof, air spaces being present between the remaining portions of the adjacent faces of the said lugs and spacing members, resulting in a considerable resistance in the connections between the plates and therefore in an appreciable loss in capacity and voltage, especially in cells of great capacity and having high discharge rates, such as those of the submarine type.

Each of the sets of positive and negative plates 3 and 4, as is usual, is connected to one or more poles or terminals extending through the top of the containers for connection in an outside circuit. Preferably, however, there are two such poles 11 for each set of plates, said poles being similar in construction and preferably made of copper. Each of the poles 11 consists of an upper cylindrical body portion 12 which extends vertically through a fluid-tight stuffing box in the top 2 of the container 1, an intermediate enlarged portion 13 which is rectangular in horizontal cross-section and of the shape shown, and a lower flat rectangular portion constituting one of the spacing members 8. It will thus be seen that the spacing members 8, which correspond in number to the poles 11, are respectively integrally formed with the poles.

By the construction described above, a large pole section is provided for each of the sets of positive and negative plates or elements, and substantially perfect contact is made over an extended area in all the connections between the poles and the plates of each set. This is especially advantageous in batteries of great capacity and having a high rate of discharge, as the internal resistance of such batteries is thereby greatly reduced, with a consequent decrease in loss of energy during charging and discharging. Moreover, the reduction of the internal resistance results in the generation of less heat within the battery cells.

Each of the stuffing boxes comprises a downwardly extending neck 14 preferably in the form of a flange struck from the top or cover 2 about the stuffing-box opening in the latter, and a pair of hard rubber sleeves or washers 15 and 16 between which is disposed a resilient packing member or ring 17, preferably of soft rubber; the sleeves 15 and 16 and ring 17 surrounding the cylindrical portion 12 of the corresponding pole 11 where it passes through the top 2. The upper end of sleeve 15 is provided with an annular flange for engaging the top 2 of the container and the lower end of sleeve 16 is provided with an annular flange between which and the shoulder formed between the portions 12 and 13 of the respective pole 11 is disposed a washer 18. A nut 19 is threaded on the upper outer end portion of each of the poles, and a washer 20 is disposed between such nut and the flange on the upper end of the corresponding sleeve 15. The nut 19 is screwed down tightly, whereupon the shoulder formed between the portions 12 and 13 of the corresponding pole 11, the washer 18 and the flange of sleeve 16 are brought into firm contact, and the flange of sleeve 15 is forced firmly into engagement with the top 2 of the container. At the same time the hard rubber sleeves 15 and 16 are forced toward each other and the soft rubber ring 17 is thereby compressed and expanded laterally to form a fluid-tight joint. The ends of sleeves 15 and 16 which engage ring 17 are preferably beveled, as shown in Fig. 1, so that but a slight movement of these sleeves toward each other is required to expand ring 17 sufficiently to obtain a tight joint between the respective pole 11 and the neck or sleeve 14.

The poles 11 and stuffing boxes constitute means whereby the entire assembled battery structure within the container 1 is conveniently supported wholly from the top 2 of the container, the four poles 11 being so arranged that the weight of the said battery structure will be practically evenly distributed on the top 2.

Each of the positive and negative plates 3 and 4 comprises a substantially rectangular grid provided with a plurality of vertical rows of equal sized openings 21 in which the positive tubes 22 or negative pockets 23 are suitably mounted, the positive tubes 22 preferably being vertically disposed and the negative pockets 23 preferably being horizontally disposed. The vertical risers between the rows of openings 21 in each grid are preferably of equal width, while the vertical riser at the pole side of the grid is preferably wider than the riser at the opposite side thereof in order that the current carrying capacity of the grid will increase toward the pole side thereof. The grids are arranged so that the vertical rows of openings 21 in each grid will respectively register with the vertical rows of openings in the adjacent grids in order to obtain the most effective relative positioning of the positive tubes and negative pockets carried by the grids. Consequently, the positive plates will project beyond the negative plates at one side of the cell and the negative plates will project beyond the positive plates at the other side of the cell, as clearly indicated in Fig. 1. At each side of the cell the projecting portions of the plates of one polarity are rigidly secured together and maintained in spaced relation to each other and to the adjacent plates of opposite polarity by means of metallic bolts 24 (only one of which is shown at each side of the cell) and insulating blocks 25 of hard rubber mounted on the bolts. The rods or bolts 24 at each side of the cell pass through the projecting portions of the plates of one polarity and serve to electrically connect the same. The hard rubber blocks 25 mounted on rods or bolts 24 are provided with recesses in which the adjacent edge portions of the plates of opposite polarity fit closely and are thereby held spaced from each other and spaced and insulated from the said projecting portions. The blocks 25 also serve to maintain the assembled positive and negative plates in fixed spaced relation to the adjacent side walls of the container 1 and insulated therefrom. All the plates are rigidly secured together and spaced and insulated from each other at their upper end portions, preferably by means of bolts 26 extending through all the plates and hard rubber washers or sleeves 27 mounted on these bolts. The arrangement of the plates and the means for connecting the same as described in this paragraph are substantially the same as described in Patent No. 1,165,101, granted December 21, 1915 to M. R. Hutchison and C. W. Norton, to which reference is made for a more detailed disclosure.

While I have described and shown the preferred embodiment of my improved battery, it is to be understood that many changes and modifications may be made therein without departing from the spirit of the invention or the scope of the appended claims.

Having now described my invention, what I claim as new and desire to protect by Letters Patent of the United States is as follows:—

1. In a storage battery having a set of positive and a set of negative elements or plates, means for rigidly and electrically connecting the plates of each set together comprising spacing members each disposed between a pair of adjacent plates in the set, a face of each of said spacing members being provided with spaced ribs in contact with the respective adjacent plate, substantially as described.

2. A spacing member adapted to be disposed between and electrically connect adjacent plates of like polarity in a battery cell, comprising a flat block provided on one face thereof with spaced ribs, substantially as described.

3. A spacing member adapted to be disposed between and electrically connect adjacent plates of like polarity in a battery cell, comprising a flat block provided with a plurality of spaced ribs on each of its faces, substantially as described.

4. A spacing member adapted to be disposed between and electrically connect adjacent plates of like polarity in a battery cell, comprising a flat block, each of the faces of said block being provided with a plurality of spaced parallel ribs the outer surfaces of which are in a common plane, substantially as described.

5. A spacing member adapted to be disposed between and electrically connect adjacent plates of like polarity in a battery cell, comprising a flat block, each of the faces of said block being provided with a plurality of spaced parallel ribs the outer surfaces of which are in a common plane, said ribs being wider than the spaces or grooves therebetween, substantially as described.

This specification signed this 22nd day of April, 1919.

LAMAR LYNDON.